Oct. 8, 1935.                P. K. FISHER ET AL                2,016,920
      MACHINE FOR MAINTAINING CONSTANT MOISTURE CONTENT IN A GRANULAR MATERIAL
                        Filed Sept. 22, 1932        5 Sheets-Sheet 1
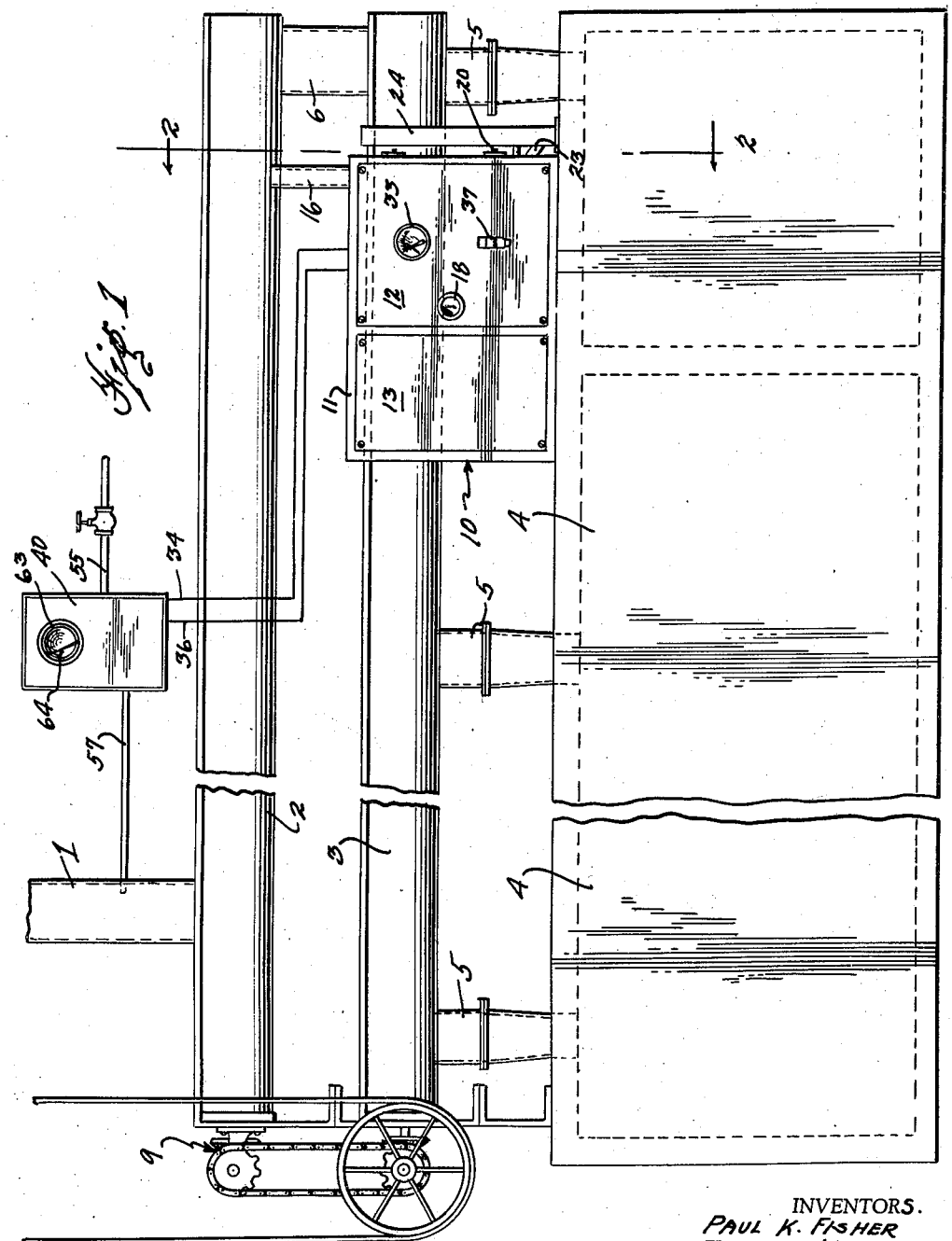
INVENTORS.
PAUL K. FISHER
JOSEPH H. WICHTNER
BY
ATTORNEY.

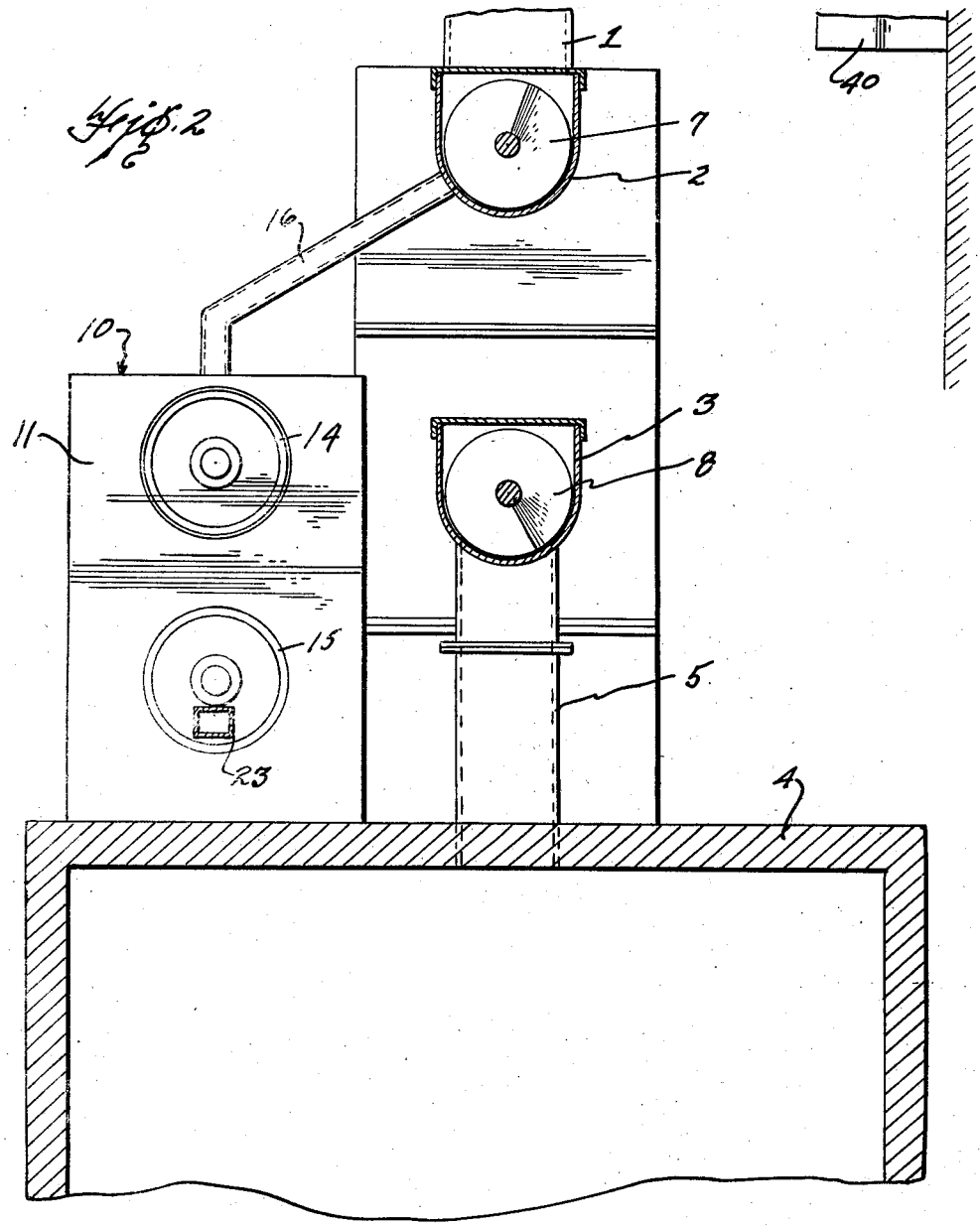

Oct. 8, 1935.　　　　P. K. FISHER ET AL　　　　2,016,920
MACHINE FOR MAINTAINING CONSTANT MOISTURE CONTENT IN A GRANULAR MATERIAL
Filed Sept. 22, 1932　　　5 Sheets-Sheet 3
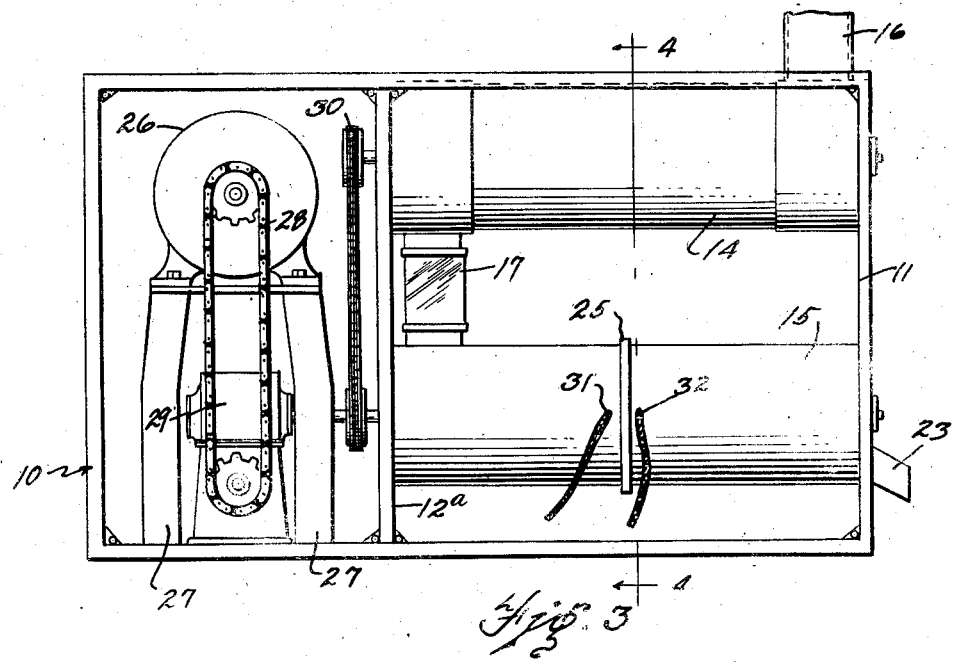
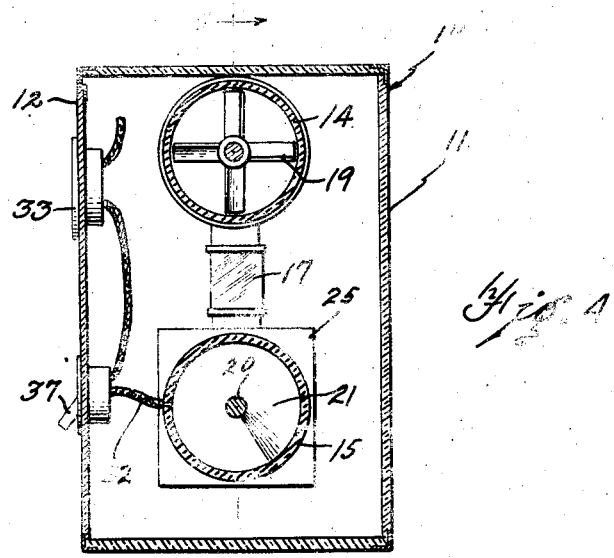
INVENTORS
PAUL K. FISHER
JOSEPH H. WICHTNER
BY
ATTORNEY.

Oct. 8, 1935.  P. K. FISHER ET AL  2,016,920
MACHINE FOR MAINTAINING CONSTANT MOISTURE CONTENT IN A GRANULAR MATERIAL
Filed Sept. 22, 1932  5 Sheets-Sheet 4

INVENTORS:
PAUL K. FISHER
JOSEPH H. WICHTNER
BY
ATTORNEY.

Oct. 8, 1935. P. K. FISHER ET AL 2,016,920
MACHINE FOR MAINTAINING CONSTANT MOISTURE CONTENT IN A GRANULAR MATERIAL
Filed Sept. 22, 1932 5 Sheets-Sheet 5
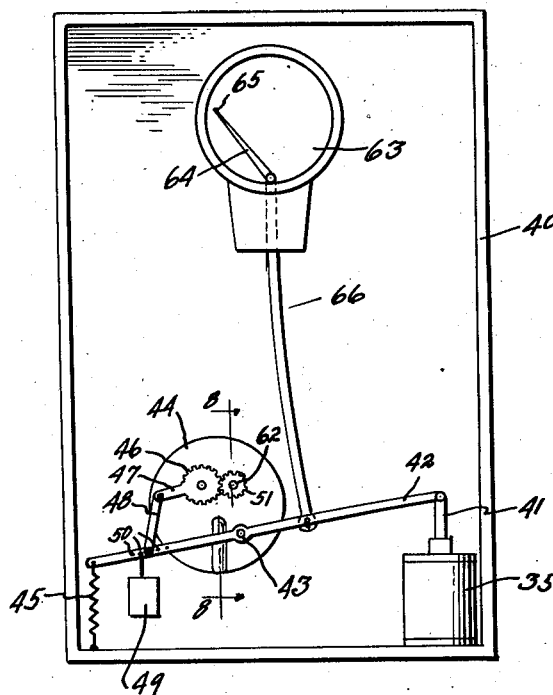
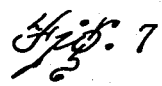
Fig. 7
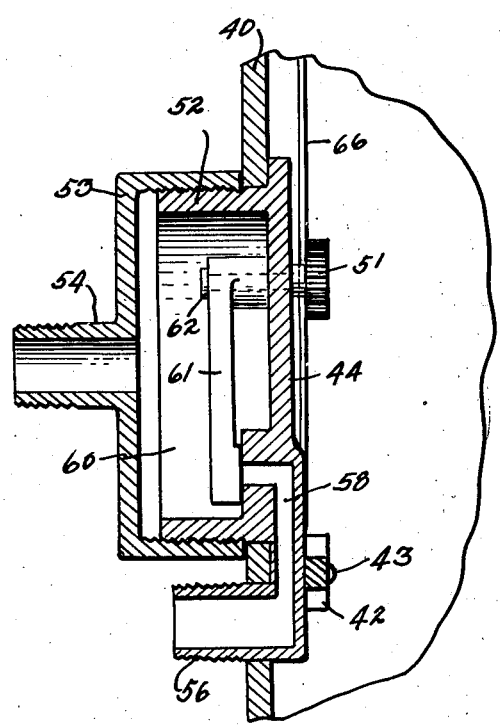
Fig. 8
INVENTORS.
PAUL K. FISHER
JOSEPH H. WICHTNER
BY
ATTORNEY.

Patented Oct. 8, 1935

2,016,920

UNITED STATES PATENT OFFICE 2,016,920

MACHINE FOR MAINTAINING CONSTANT MOISTURE CONTENT IN A GRANULAR MATERIAL

Paul K. Fisher and Joseph H. Wichtner, Detroit, Mich., assignors to The Commercial Milling Company, a corporation of Michigan Application September 22, 1932, Serial No. 634,420

18 Claims. (Cl. 83—28)

This invention relates to machines for automatically determining the moisture content of granular material.

In preparing wheat in flour mills preparatory to grinding, it is customary to moisten the wheat to bring the moisture content thereof up to that permitted by law which is 15% by weight. The wheat, as a rule, has a moisture content below that permitted by law so that in order to raise the moisture content to 15% it is necessary to add water to the wheat.

It has heretofore been the practice to make sample tests of the wheat and then add sufficient water to raise the moisture content thereof to a predetermined point. These tests, as a rule, require considerable length of time and inasmuch as the machines are running, during this time, to deliver wheat to the storage bins, all of the wheat delivered during the time of the taking of the tests might not have the correct moisture content and would consequently cause a considerable loss to the mill.

It is, therefore, an object of this invention to provide a device which will automatically test the wheat for moisture content, as it is being fed through the conveyors to the storage bins and which will automatically add sufficient water to the wheat to maintain the moisture content of the same to that permitted by law.

Another object of the invention resides in the provision of a device of this character for maintaining the correct moisture content of a flowing body of granular material and which is provided with means for recording the percentage at all times of moisture in the granular material.

Another object of the invention resides in the provision of a device of this character having a water conduit opening to the material as it flows to the conveyor and a valve in the water conduit which is automatically controlled to deliver the correct amount of water to the wheat to maintain the correct amount of moisture content therein.

Another object of the invention resides in the provision of a device of this character having a water valve, for controlling the amount of water added to the granular material, the same being controlled by an electro-magnet, and, that in turn being controlled by the amount of electric current flowing through a portion of the granular material.

These objects and the several novel features of the invention are hereinafter more fully described and claimed and the preferred form of construction by which these objects are attained is shown in the accompanying drawings in which—

Fig. 1 is an elevational view of a delivering device having my improved tester and control mechanism connected therewith.

Fig. 2 is a section taken substantially on line 2—2 of Fig. 1.

Fig. 3 is an elevational view of the tester having the front cover removed.

Fig. 4 is a section taken on line 4—4 of Fig. 3.

Fig. 7 is an elevational view of the water valve control device, the cover being removed.

Fig. 8 is an enlarged detail sectional view taken on line 8—8 of Fig. 7.

Figure 5:
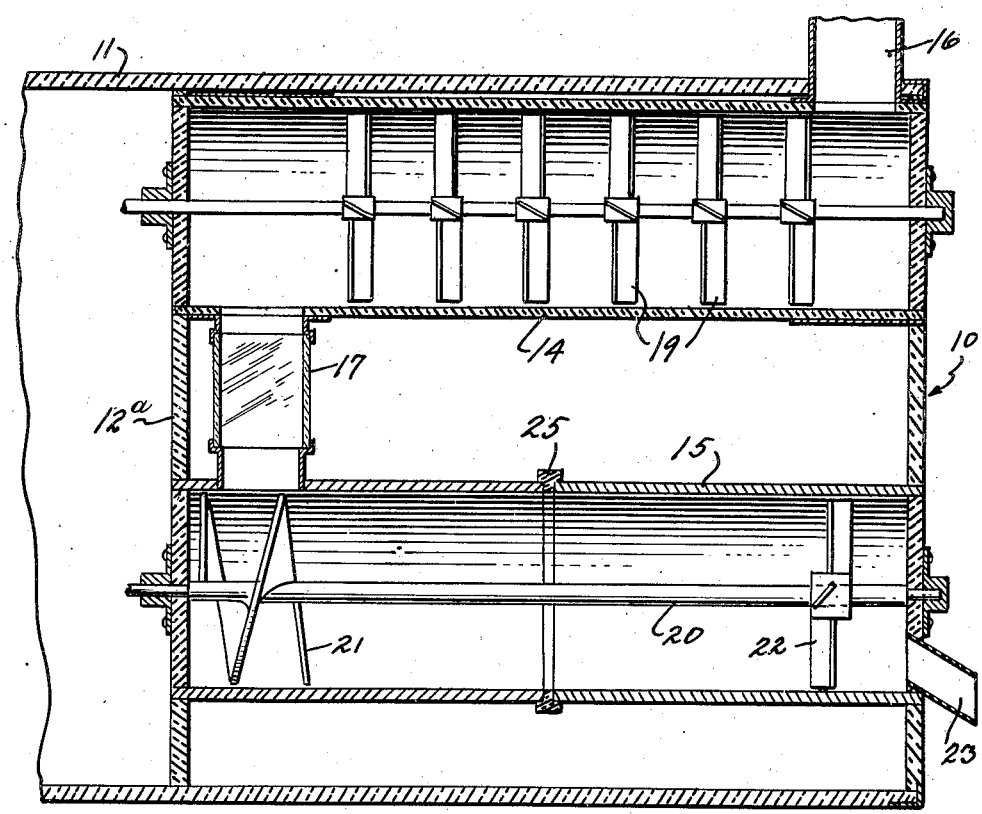
Fig. 5 is an enlarged sectional view taken on line 5—5 of Fig. 4.
Figure 6:
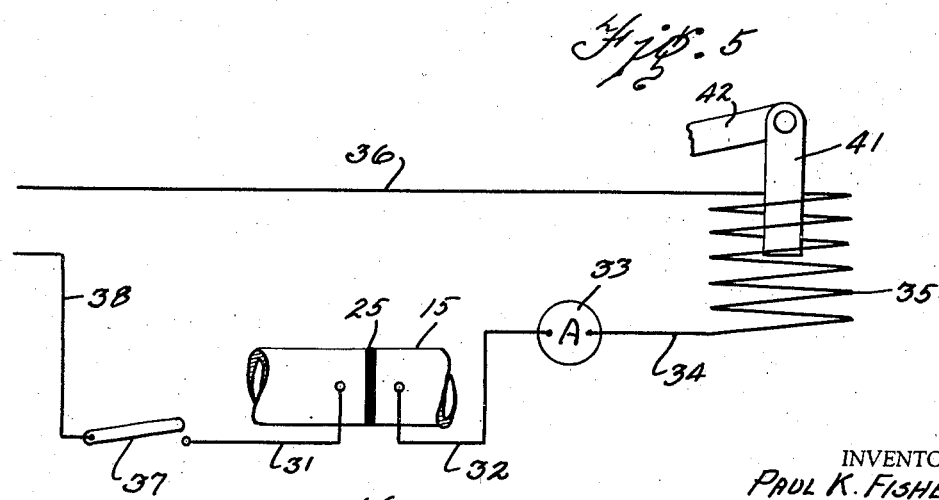
Fig. 6 is a schematic wiring diagram.

Referring to the drawings, the delivery pipe 1 has its lower end connected to the conduit 2 adjacent one end thereof and a similar conduit 3 is positioned below the conduit 2 and is connected to the storage bins 4 by means of the spaced vertically extending conduits 5. The vertically extending conduit 6 delivers wheat or other granular material from one end of the conduit 2 to the adjacent end of the conduit 3. A screw conveyor 7 is positioned in the conduit 2 to move the wheat from the delivery pipe 1 to the conduit 6, and a screw conveyor 8 is positioned in the conduit 3 to move the wheat along the conduit and deliver the same into the bins 4.

Suitable driving mechanism 9 is positioned adjacent one end of the conduits 2 and 3 for rotating the conveyors 7 and 8. A tester 10 preferably rests on the top of the bins 4 and is positioned adjacent the ends of the conduits 2 and 3, to which the conduit 6 is attached. The tester comprises the box like structure 11 having the removable covers 12 and 13 closing one side thereof, the same being removable to permit access to the interior of the tester. The walls of the box are preferably formed of some insulating material such as hard rubber or the like, and a partition 12a also of some insulating material extends transversely of the box.

A hollow cylindrical member 14 is supported in one end wall of the box like structure 11 and in the partition 12a, and a cylindrical member 15 is positioned below the member 14 and is similarly supported. A conduit 16 opens into the member 14 adjacent one end thereof and the opposite end of the conduit opens into the conduit 2 adjacent the bottom thereof. A vertically extending conduit 17 connects the tubular member 14 to the tubular member 15 and the same is preferably of some transparent material such as glass, whereby the flow of material may be observed through the glass sight 18 in the cover 12.

A conveyor 19 of any suitable construction is positioned in the tubular member 14 and is supported in suitable bearings in one end wall and in the partition 12a of the box like structure 11.

A shaft 20 is positioned in the tubular member 15 and is likewise carried in suitable bearings in the end wall and in the partition 12. A spiral conveyor 21 is secured to the shaft 20 adjacent the partition 12a and a blade conveyor 22 is also secured to the shaft 20 adjacent the opposite end of the tubular member 15. A chute 23 opens into the tubular member 15 adjacent the conveyor 22 and the opposite end of the same is connected to the lower end of the elevator 24, whereby the material from the tubular member 15 will be redelivered into the conduit 3.

It will be seen by referring to Fig. 5 that the tubular member 15 is divided into two sections by the insulating member 25 for a purpose to be hereinafter described. An electric motor 26 is mounted on the standard 27, the same being suitably secured to the base of the box like structure 11, and rotates the conveyors 19 and 21 and 22 through the sprocket chain 28, the speed reducer 29 and the sprocket chain 30.

By referring to Figs. 3 and 4 it will be seen that the wires 31 and 32 are suitably secured in the wall of the tubular member 15, one on each side of the insulating divider 25. A wire 32 connects to the electric measuring instrument 33, such as an ammeter, the same being preferably mounted in the panel 12 and a wire 34 leads from the ammeter to the electromagnet 35 and a wire 36 leads from the opposite end of the electromagnet 35 to a source of current supply not shown.

The wire 31 connects to one terminal of the switch 37, the same being likewise preferably mounted in the panel 12, and a wire 38 leads from the opposite terminal of the switch to the source of current supply. The electromagnet 35 is preferably positioned in the box like member 40 which may be positioned in any part of the building in which the device is installed, but is here shown as being positioned adjacent the delivery pipe 1. The upper end of the core 41 of the electromagnet 35 has one end of the bar 42 pivotally connected thereto, the intermediate portion of the bar being pivotally connected at 43 to the disc 44, and a spring 45 is connected to the opposite end of the bar 42 and tends to lift the core 41 from the electromagnet 35. A gear 46 is pivotally connected to the disc 44 and the extension 47 thereon is pivotally connected to one of the links 48, the opposite end of the link being pivotally connected to the bar 42. A weight 49 is suspended from the bar 42 and may be adjustably positioned away or toward pivot point 43 by moving the same to any one of the spaced apertures 50 in the bar 42. A gear 51 is also pivotally mounted upon the disc 44 and meshes with the gear 46, whereby rotation of the gear 46 will impart rotation to the gear 51.

The disc 44 is provided with the threaded tubular extension 52, on which is threaded the cup shaped member 53, the same being provided with the threaded hollow boss 54, to which one end of the water supply pipe 55 is suitably connected, the opposite end of the supply pipe being connected to a source of water supply (not shown).

The disc 44 is formed with the hollow threaded boss 56, to which one end of the pipe 57 is connected, the opposite end of the pipe preferably opening into the delivery pipe 1. A passageway 58 is formed in the disc 44 and one end connects to the hollow boss 56, while the opposite end opens into the chamber 60 formed by the disc 44 and the cup shaped member 53. The valve 61 is secured to the pivot 62 of the gear 51 and is adapted to oscillate upon movement of the gear 51 to open and close the passageway 58 for a purpose to be hereinafter described. A time recording dial 63 of any well known construction is also mounted upon the rear wall of the box like structure 40 and the free end of the arm 64 is provided with the usual marking device 65. The bar 66 is connected to the pivot of the arm 64 and to the bar 42 so that movement of the bar 42 will move the arm 64 and give a permanent record of movement of the bar 42. It will be noted that the conduit 16 is considerably smaller than the conduit 6 so that only a small portion of the granular material passing through the conduit 2 will be delivered to the tester 10.

It will be further noted that due to the construction of the conveyors 21 and 22 that a uniform body of wheat will be maintained in the tubular member 15 between the conveyors 21 and 22, but which is continuously changing as the wheat moves through the tester.

It will be further noted that since the tubular member 15 is insulated from the other parts of the tester and since the same is divided into two sections by the insulating material 25, that current flowing from the source of current supply through the wire 31, must pass through the body of wheat or granular material that is positioned between the conveyors 21 and 22 in order to pass to the wire 32. It will thus be seen that the amount of current flowing between the wires 31 and 32 will be dependent upon the amount of moisture in the wheat and will consequently govern the amount of current flowing through the electromagnet 35 and the amount of current flowing through the electromagnet 35 will govern the position of the core 41, the same being drawn farther into the electromagnet against the action of the spring 45 and the weight 49 as the current flow increases.

It will be seen that the granular material flowing through the delivery pipe 1 will have a chance to be thoroughly mixed as it is moved by the conveyor 7 to the conduit 2 to the tester 10. It will thus be noted that by the time the material reaches the tester 10 that the moisture content of granular material will be uniform so that there will be practically no change in current flow between the terminals of the wires 31 and 32 except when the moisture content of the granular material flowing through the delivery pipe 1 or the volume of granular material is changed.

The operation of the device is as follows: Wheat or other granular material is fed through the delivery pipe 1 into the conduit 2 and is moved by the conveyor 7 toward the conduit 6, where it is delivered into the conduit 3 and the conveyor 8 will move the material along and distribute the same through the conduits 5 into the bins 4. A certain percentage of the granular material will fall through the conduit 16 into the tubular member 14 of the tester 10 and the conveyor 19 will move the material along the tubular member to the conduit 17, where it will fall into the tubular member 15 and the conveyor 21 will move the same along toward the conveyor 22, that in turn discharging the same through the chute 23 to the elevator 24, whereupon it will be delivered into the conduit 3. The conveyor 22 will not move the material as rapidly as the conveyor 21, so that a constant body of wheat is maintained in the tubular member 15 between the conveyors 21 and 22 but this body of wheat is continuously changing, as will be readily understood.

It will thus be seen that the moister the wheat the less resistance to the flow of current between the terminals of the wires 31 and 32 and the more current flow through the electromagnet 35, thereby drawing the core 41 farther down into the electromagnet against the action of the spring 45 and moving the valve 61 to reduce the size of the opening in the passageway 58, thus partly shutting off flow of water through the pipe 57 to the delivery pipe 1.

This same action of the valve 61 will take place providing a flow of wheat through the delivery pipe 1 is reduced as the wheat will become too greatly saturated allowing a greater amount of current to flow through the solenoid 35, thereby moving the valve toward its closed position. The opposite action will take place proviidng the moisture content of the wheat is reduced as the resistance to the flow of current will be greater, cutting down the amount of current through the solenoid and allowing the springs 45 to move the valve 61 wider open, allowing more water to flow through the pipe 57 onto the wheat. This same result will occur when a greater volume of wheat is being delivered through the pipe 1 as the same will not have sufficient moisture and the valve will be moved wider open until the wheat has reached a predetermined moisture content.

By adjusting the weight 49 along the bar 42 or by changing the tension on the springs 45, the device may be set to maintain the moisture content at different percentages as desired.

It will thus be seen that the device is entirely automatic in operation to maintain a continuous stream of granular material at a predetermined moisture content. It will be further noted that the recording dial 63 will keep an accurate record of the percentage of water added to the material as the marker 65 is controlled in its movement by movement of the bar 42 and will indicate when the valve 61 is moved to open or close.

From the foregoing description it becomes evident that we have provided a device for maintaining the moisture content of a flowing body of granular material at a predetermined amount; further that the device is entirely automatic in operation, is simple in construction so as to not easily get out of order and is extremely sensitive and accurate so as to maintain the moisture content of granular material within extremely close limits.

Having thus fully described our invention, its utility and mode of operation, what we claim and desire to secure by Letters Patent of the United States is—

1. A device of the character described comprising a hollow conduit, means for moving granular material prior to a portion thereof entering the second conduit therethrough, a second conduit connected to the first named conduit being of smaller cross sectional area than the first named conduit, means for causing a portion of the granular material from the first named conduit to traverse the second named conduit, means for adding moisture to the granular material prior to a portion thereof entering the second conduit, means for passing an electric current through the granular material in the second named conduit and means responsive to changes in the electrical conductivity of the granular material for regulating the amount of moisture added thereto, said means operating to increase the amount of moisture being added to the material upon a decrease in the electrical conductivity thereof and to decrease the amount of moisture being added upon increase in the electrical conductivity.

2. A device of the character described comprising a hollow conduit, means for moving granular material therethrough, means for maintaining a constant volume of granular material in a portion of the conduit, said means comprising a conveyor for forcing material into the conduit and a discharge conveyor spaced therefrom whereby the material is compacted between the said conveyors, means for passing an electric current through the constant volume of granular material, means for adding moisture to the granular material prior to its passage through the conduit and means responsive to changes in the electrical conductivity of the granular material for regulating the amount of moisture added thereto, said means operating to increase the amount of moisture being added to the material upon a decrease in the electrical conductivity thereof and to decrease the amount of moisture being added upon increase in the electrical conductivity.

3. A device of the character described comprising means for passing electric current through a portion of a flowing body of granular material, means for discharging water into the flowing body prior to its subjection to the electric current and electro-magnetic means, connected to the water discharging means, responsive to changes in the electrical conductivity of the granular material for regulating the amount of water discharged thereinto, said means operating to increase the amount of moisture being added to the material upon a decrease in the electrical conductivity thereof and to decrease the amount of moisture being added upon increase in the electrical conductivity.

4. A device of the character described comprising a hollow conduit, means for moving granular material therethrough, means for passing an electric current through the granular material, means for adding moisture to the granular material prior to its movement through the conduit and electro-magnetic means, connected to the moisture adding means, responsive to changes in the electrical conductivity of the granular material for regulating the amount of moisture added thereto, said means operating to increase the amount of moisture being added to the material upon a decrease in the electrical conductivity thereof and to decrease the amount of moisture being added upon increase in the electrical conductivity.

5. A device of the character described comprising a hollow conduit, means for moving granular material therethrough, means for adding moisture to the granular material prior to its movement through the conduit, means for maintaining a constant volume of granular material in one portion of the conduit, means for passing an electric current through the constant volume of granular material and electro-magnetic means, connected to the moisture adding means, responsive to changes in the electrical conductivity of the granular material for regulating the amount of moisture added thereto, said means operating to increase the amount of moisture being added to the material upon a decrease in the electrical conductivity thereof and to decrease the amount of moisture being added upon increase in the electrical conductivity.

6. A device of the character described comprising a horizontally disposed hollow conduit, means for moving granular material therethrough, a second conduit having a vertically extending portion connected to the horizontal conduit, adjacent the bottom thereof, whereby a portion of the granular material is caused to flow by gravity through the vertical portion of the second named conduit, means for adding moisture to the granular material in the hollow conduit to the rear of the connection of the second conduit therewith, means for passing an electric current through the granular material in the second named conduit and means responsive to changes in the electrical conductivity of the granular material for regulating the amount of moisture added thereto, said means operating to increase the amount of moisture being added to the material upon a decrease in the electrical conductivity thereof and to decrease the amount of moisture being added upon increase in the electrical conductivity.

7. A device of the character described comprising a horizontally disposed hollow conduit, means for moving granular material therethrough, a second conduit having a vertically extending portion opening into the first named conduit, adjacent the bottom thereof, whereby a portion of the granular material will flow by gravity through the vertically extending portion of the second conduit, means for adding moisture to the granular material in the hollow conduit to the rear of the connection of the second conduit therewith, means for maintaining a constant volume of granular material in a portion of the second conduit, means for passing an electric current through the constant volume of granular material and means responsive to changes in the electrical conductivity of the granular material for regulating the amount of moisture added thereto, said means operating to increase the amount of moisture being added to the material upon a decrease in the electrical conductivity thereof and to decrease the amount of moisture being added upon increase in the electrical conductivity.

8. A device of the character described comprising a hollow conduit, means for moving granular material therethrough, a second conduit, connected to the first named conduit, being of smaller cross sectional area than the first named conduit, means for causing a portion of the granular material from the first named conduit to traverse the second named conduit, means for adding moisture to the granular material in the first named conduit, means for passing an electric current through the granular material in the second named conduit and electro-magnetic means, connected to the moisture adding means, responsive to changes in the electrical conductivity of the granular material for regulating the amount of moisture added thereto, said means operating to increase the amount of moisture being added to the material upon a decrease in the electrical conductivity thereof and to decrease the amount of moisture being added upon increase in the electrical conductivity.

9. A device of the character described comprising a horizontally disposed hollow conduit, means for moving granular material therethrough, a second conduit having a vertically extending portion opening into the first named conduit adjacent the bottom thereof whereby a portion of the granular material will flow by gravity through the vertically extending portion of the second conduit, means for adding moisture to the granular material in the first named conduit, means for maintaining a constant volume of granular material in a portion of the second conduit, means for passing an electric current through the constant volume of granular mate-
rial and electro-magnetic means, connected to the moisture adding means, responsive to changes in the electrical conductivity of the granular material for regulating the amount of moisture added thereto, said means operating to increase the amount of moisture being added to the material upon a decrease in the electrical conductivity thereof and to decrease the amount of moisture being added upon increase in the electrical conductivity.

10. A device of the character described comprising a hollow conduit, including two sections, means between the adjacent ends of the two sections, said means being of a character and so arranged as to compact the material to thereby maintain a constant volume of material between the adjacent ends of the two sections for insulating the same from each other, means for moving granular material through the two sections, means for adding moisture to the granular material prior to its movement into the area of constant volume, an electric circuit, one wire of the circuit being connected to one of the sections and the other wire of the circuit being connected to the other section whereby the amount of current flowing through the circuit is dependent upon the electrical conductivity of the granular material between the two sections of the conduit and means responsive to changes in the electrical conductivity of the granular material for regulating the amount of moisture added thereto, said means operating to increase the amount of moisture being added to the material upon a decrease in the electrical conductivity thereof and to decrease the amount of moisture being added upon increase in the electrical conductivity.

11. A device of the character described comprising a hollow conduit, including two sections of equal cross sectional area in spaced relation, means for moving granular material through the two sections, means for maintaining a constant volume of granular material between the sections, means for adding moisture to the granular material prior to its movement into the area of constant volume, means for passing an electric current through the constant volume of granular material and means responsive to changes in the electrical conductivity of the granular material for regulating the amount of moisture added thereto, said means operating to increase the amount of moisture being added to the material upon a decrease in the electrical conductivity thereof and to decrease the amount of moisture being added upon increase in the electrical conductivity.

12. A device of the character described, comprising a conduit formed of two axially aligned parts, an insulating ring separating the parts, means for supplying granular material to the inlet end of the conduit, a discharge means for material at the opposite end, said supply and discharge means being spaced apart providing an area in which the material is compacted and of greatest density at approximately the plane of the insulating ring, an electric circuit having a terminal in each part of the conduit adjacent the insulating ring wherein a comparatively short electrical path through the material is provided, means for adding moisture to the material prior to its passing into the area between the terminals of the conduit, and electrically operated means in the circuit controlled by variation in the electrical conductivity of the material passing the insulating ring arranged to operate the moisture adding means to supply a variable amount of moisture to the material and to thereby maintain the moisture content substantially constant.

13. A device of the character described, comprising in combination with a conduit through which material flows, of means for adding moisture to the material, a second conduit to which the part of the material from the first conduit is discharged, said second conduit being formed of two parts in insulated relation one to the other and to the other parts of the apparatus, a conveyor element for passing material received from the first conduit longitudinally of the second conduit, means whereby the material in said second conduit is compacted intermediate its length, an insulating ring between the two parts of the conduit, an electric circuit having a terminal in each part of the conduit completed by the compacted material therebetween, and means in the said circuit controlled by variation in the electrical conductivity of the material in the conduit between the terminals for operating the moisture adding means to supply a variable amount of moisture to the material of the first conduit in inverse ratio relation to the electrical conductivity of the material between the said terminals to thereby maintain the moisture content of the material discharging through the first named conduit practically constant.

14. A device of the character described, comprising the combination with a conduit through which material is discharged, of means for adding moisture to the material, a main discharge conduit for said first named conduit and a secondary discharge conduit therefor through which a small amount of material may pass, means associated with the said secondary conduit for receiving the material and including a two-part conduit in insulated relation one to the other and to the other parts of the apparatus, means for causing material to pass through the said two-part conduit in a compacted condition, an electric circuit having two terminals connected respectively with each of the conduits adjacent the insulated point, and means in the said circuit responsive to variation in electrical conductivity of the material of the said two-part conduit between the terminals to actuate the moisture adding means to supply a variable amount of moisture to the material of the first named conduit inversely as the electrical conductivity of the material between the terminals varies.

15. In apparatus of the character described, the combination with a conduit through which material is discharged, of a conduit opening thereto into which the material from the main conduit passes by gravity, a conduit to which the said gravity discharged material passes, said conduit being formed of two axially aligned parts, an insulating ring therebetween, an electric circuit having a terminal connected respectively with each of the parts of the conduit adjacent the insulating ring, means for adding moisture to the material in the first named conduit, and electromagnetically controlled means for varying the amount of moisture added in inverse ratio to the electrical conductivity of the material in the two-part conduit between the said terminals.

16. In apparatus of the character described, the combination with a conduit through which a body of material is passed, of means including a conduit and a valve therein for supplying water to the material, means for controlling the extent of opening of the valve to thereby vary the quantity of water supplied to the material, comprising a second conduit, means by which a portion of the material flowing through the first conduit passes to the said second conduit, said second conduit being formed of two axially aligned parts, an insulating ring therebetween having a diameter of opening practically the same as the two-part conduit, means at one end of the conduit for causing material discharging thereto to be moved axially of the two-part conduit, means at the opposite end of the conduit for discharging the material therefrom, an electric circuit including an electro-magnet and a core therefor, and means connected with the core whereby movement of the same by the magnet turns the valve, a spring for moving the core in the opposite direction, the parts being so arranged that an increasing electrical flow of current in the circuit through increased electrical conductivity of the material passing between the terminals in the said two-part conduit tends to move the said core to close the valve and a decrease in the electrical conductivity and consequent movement of the core in an opposite direction by the spring increases the opening of the valve thereby maintaining the moisture content of the material flowing in the main conduit substantially constant.

17. In apparatus of the character described, a conduit through which material, such as wheat, may flow, means by which a part of the said material may be discharged from the conduit, a two-part conduit to which the said part of the material is discharged, the two parts being in insulated relation with the remainder of the apparatus, an insulating ring separating the adjacent ends of the two parts, an electric circuit, the terminals of which are respectively attached to the adjacent ends of the said two parts, and a moisture supplying means for the material flowing in the main conduit controlled by variation in the electrical conductivity of the material passing the terminals of the conduit to increase the flow of moisture to the material on a decrease in electrical conductivity of the material between the terminals of the circuit and to decrease the flow of moisture as the electrical conductivity of the said portion of the material increases.

18. A device of the character described, comprising a hollow conduit, means for moving granular material therethrough, means for maintaining a constant volume of granular material in one portion of the conduit, means for passing electric current through the granular material in the said portion of the conduit containing the constant volume, means for adding moisture to the granular material prior to passing to the portion of the conduit containing the constant volume, and means responsive to changes in electrical conductivity of the granular material at the point of constant volume for regulating the amount of moisture added to the material, said means operating to increase the amount of moisture being added to the material upon a decrease in the electrical conductivity and to decrease the amount of moisture being added upon increase in electrical conductivity.

PAUL K. FISHER.
JOSEPH H. WICHTNER.